United States Patent
Han et al.

(10) Patent No.: US 10,057,311 B2
(45) Date of Patent: Aug. 21, 2018

(54) METHOD OF TRANSMITTING SYSTEM INFORMATION WITH EXTENDED DRX CYCLE IN WIRELESS COMMUNICATION SYSTEM AND APPARATUS THEREFOR

(71) Applicant: LG ELECTRONICS INC., Seoul (KR)

(72) Inventors: Sangwook Han, Seoul (KR); Sunghoon Jung, Seoul (KR); Youngdae Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 64 days.

(21) Appl. No.: 15/235,944

(22) Filed: Aug. 12, 2016

(65) Prior Publication Data

US 2017/0048842 A1    Feb. 16, 2017

Related U.S. Application Data

(60) Provisional application No. 62/204,442, filed on Aug. 13, 2015.

(51) Int. Cl.
*H04W 72/04* (2009.01)
*H04W 68/02* (2009.01)
*H04L 29/06* (2006.01)
*H04W 52/02* (2009.01)
*H04W 88/02* (2009.01)
*H04W 76/28* (2018.01)

(52) U.S. Cl.
CPC ..... *H04L 65/4076* (2013.01); *H04W 52/0216* (2013.01); *H04W 68/02* (2013.01); *H04W 76/28* (2018.02); *H04W 88/02* (2013.01); *Y02D 70/00* (2018.01); *Y02D 70/1242* (2018.01); *Y02D 70/1262* (2018.01); *Y02D 70/1264* (2018.01); *Y02D 70/24* (2018.01)

(58) Field of Classification Search
CPC ........... H04W 72/0406; H04W 72/005; H04W 76/048; H04W 68/02; H04W 88/02
See application file for complete search history.

(56) References Cited

U.S. PATENT DOCUMENTS

| | | | | |
|---|---|---|---|---|
| 8,180,335 B2* | 5/2012 | Kitazoe | ......... | H04W 48/12 370/328 |
| 8,433,346 B2* | 4/2013 | Fischer | ......... | H04W 72/121 455/466 |
| 9,313,736 B2* | 4/2016 | Cucala Garcia | .... | H04W 76/048 |
| 9,326,207 B2* | 4/2016 | Jha | ......... | H04W 36/22 |

(Continued)

*Primary Examiner* — Rasheed Gidado
(74) *Attorney, Agent, or Firm* — Birch, Stewart, Kolasch & Birch, LLP

(57) ABSTRACT

The present specification proposes a method for receiving system information by a user equipment (UE) configured with an extended discontinuous reception (eDRX) in a wireless communication system. Specifically, the method includes the step of receiving a paging message including an indicator indicating system information modification in a modification period within an active time of the eDRX; determining whether to receive the system information by comparing the active time with the modification period; and receiving the system information in a next modification period when it is determined to receive the system information.

4 Claims, 9 Drawing Sheets

(56) References Cited

U.S. PATENT DOCUMENTS

| | | | |
|---|---|---|---|
| 2008/0318566 A1* | 12/2008 | Chun | H04W 48/12 |
| | | | 455/422.1 |
| 2016/0044605 A1* | 2/2016 | Vajapeyam | H04W 52/322 |
| | | | 370/311 |
| 2016/0112948 A1* | 4/2016 | Liang | H04W 24/02 |
| | | | 370/311 |
| 2016/0192292 A1* | 6/2016 | Hoglund | H04W 52/0216 |
| | | | 370/311 |
| 2016/0242231 A1* | 8/2016 | Vajapeyam | H04W 76/048 |
| 2016/0295504 A1* | 10/2016 | Wang | H04W 52/02 |
| 2016/0330791 A1* | 11/2016 | Vajapeyam | H04W 76/048 |

* cited by examiner (a) Control-Plane Protocol Stack (b) User-Plane Protocol Stack Read SI in the next BCCH Modification period Sleep after active time without reading SI in the next BCCH Modification period

METHOD OF TRANSMITTING SYSTEM INFORMATION WITH EXTENDED DRX CYCLE IN WIRELESS COMMUNICATION SYSTEM AND APPARATUS THEREFOR

CROSS-REFERENCE TO RELATED APPLICATIONS

This application claims the benefit of the U.S. Provisional Patent Application No. 62/204,442, filed on Aug. 13, 2015 which is hereby incorporated by reference as if fully set forth herein.

BACKGROUND OF THE INVENTION

Field of the Invention

The present invention relates to a wireless communication system, and more particularly, to a method of transmitting system information with an extended DRX (Discontinuous Reception) cycle in a wireless communication system and an apparatus therefor.

Discussion of the Related Art

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

SUMMARY OF THE INVENTION

Accordingly, the present invention is directed to an apparatus and method thereof that substantially obviate one or more problems due to limitations and disadvantages of the related art.

An object of the present invention is to provide a method of transmitting system information with an extended DRX (Discontinuous Reception) cycle in a wireless communication system and an apparatus therefor in the following based on the aforementioned discussion.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of receiving system information by a user equipment (UE) configured with an extended discontinuous reception (eDRX) in a wireless communication system, includes the steps of receiving a paging message including an indicator indicating system information modification in a modification period within an active time of the eDRX; determining whether to receive the system information by comparing the active time with the modification period; and receiving the system information in a next modification period when it is determined to receive the system information.

To further achieve these objects and other advantages and in accordance with the purpose of the invention, as embodied and broadly described herein, according to a different embodiment, a user equipment (UE) configured with an extended discontinuous reception (eDRX) in a wireless communication system includes a radio frequency (RF) module; and a processor configured to receive a paging message including an indicator indicating system information modification in a modification period within an active time of the eDRX, determine whether to receive system information by comparing the active time with the modification period, and receive the system information in a next modification period when it is determined to receive the system information.

Preferably, if remaining active time is greater than or equal to remaining modification period, it is determined to receive the system information. Further, if the remaining active time is less than the remaining modification period, it is determined not to receive the system information. More preferably, if the remaining active time is less than the remaining modification period, the UE sleeps without receiving the system information upon expiration of the action time.

Preferably, the remaining active time and the remaining modification period is calculated based on a reception time of the paging message. Furthermore, a number of paging occasions in one active time of the eDRX is two or more/

According to embodiments of the present invention, it is able to efficiently transmit system information with an extended DRX (Discontinuous Reception) cycle in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

Figure 1:
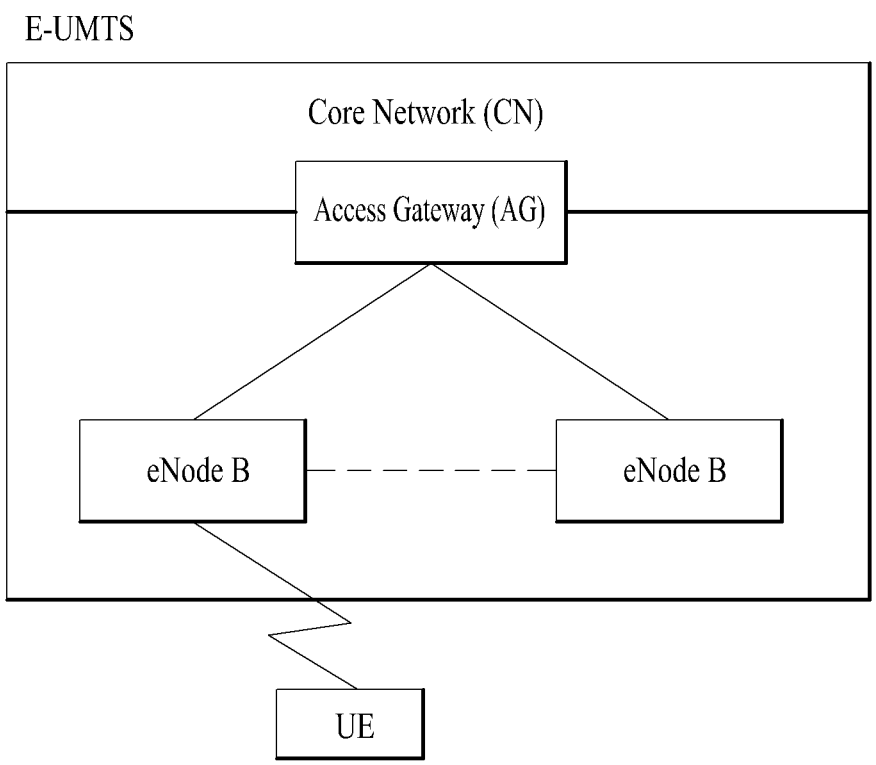
FIG. 1 is a diagram showing a network structure of an Evolved Universal Mobile Telecommunications System (E-UMTS) as an example of a wireless communication system.
Figure 2:
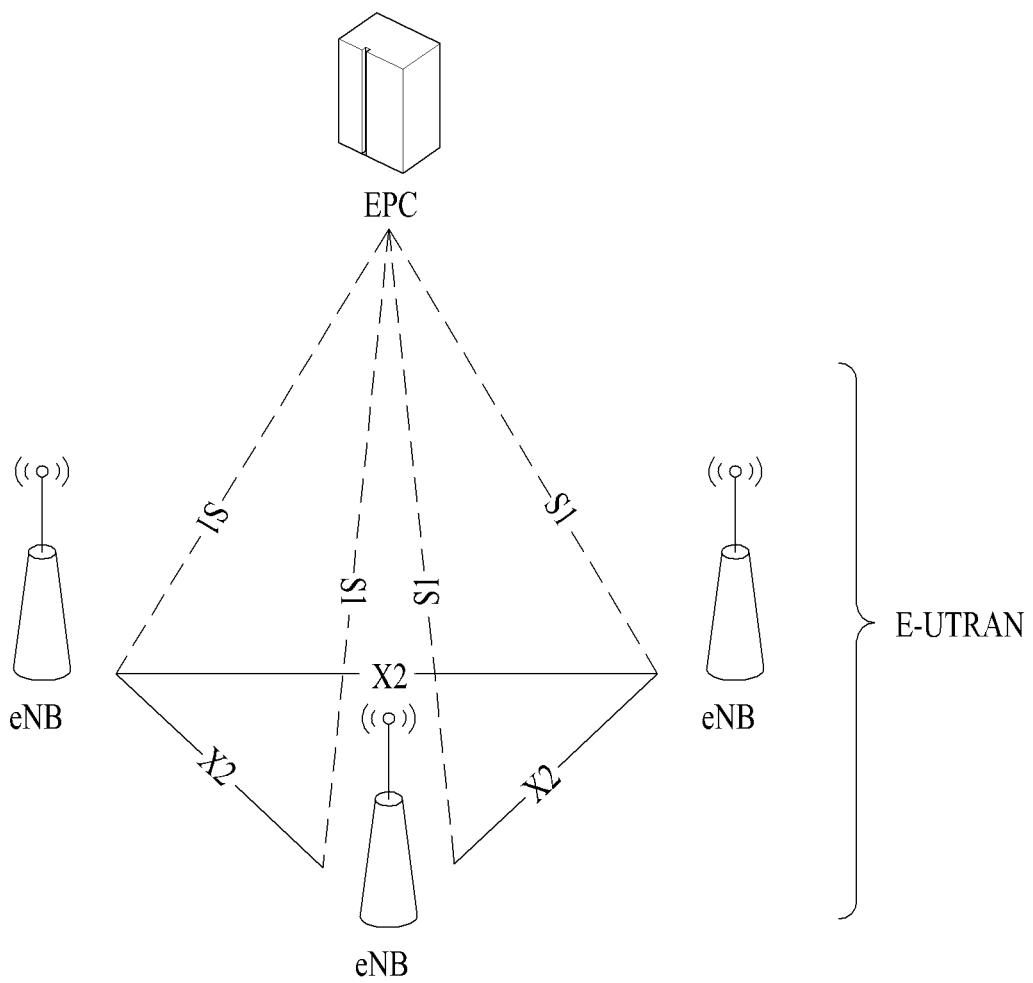
FIG. 2 is a diagram conceptually showing a network structure of an evolved universal terrestrial radio access network (E-UTRAN).

FIG. 2 is a diagram conceptually showing a network structure of an evolved universal terrestrial radio access network (E-UTRAN). An E-UTRAN system is an evolved form of a legacy UTRAN system. The E-UTRAN includes cells (eNB) which are connected to each other via an X2 interface. A cell is connected to a user equipment (UE) via a radio interface and to an evolved packet core (EPC) via an S1 interface.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
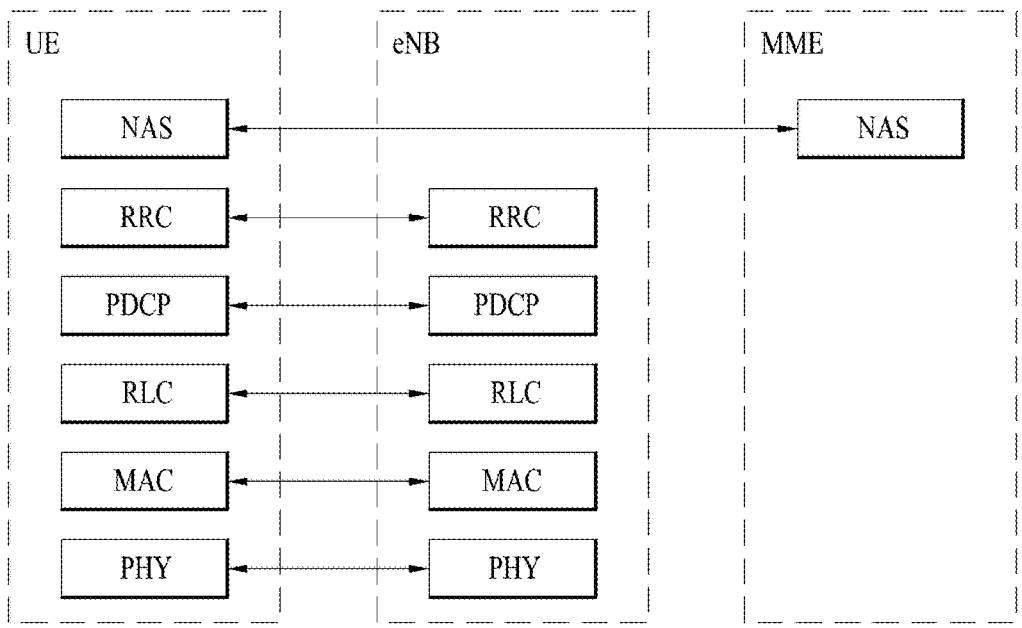
FIG. 3 is a diagram showing a control plane and a user plane of a radio interface protocol between a UE and an E-UTRAN based on a 3rd generation partnership project (3GPP) radio access network standard.
Figure 3:
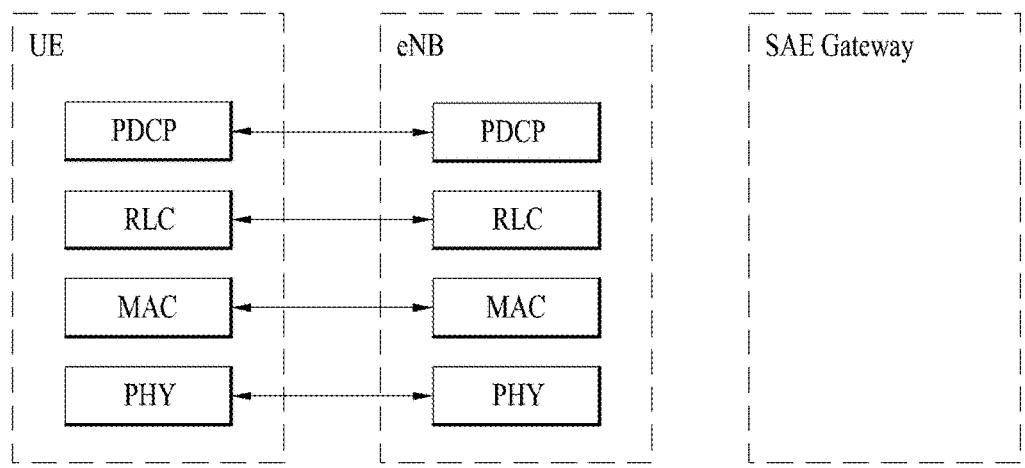

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH). Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
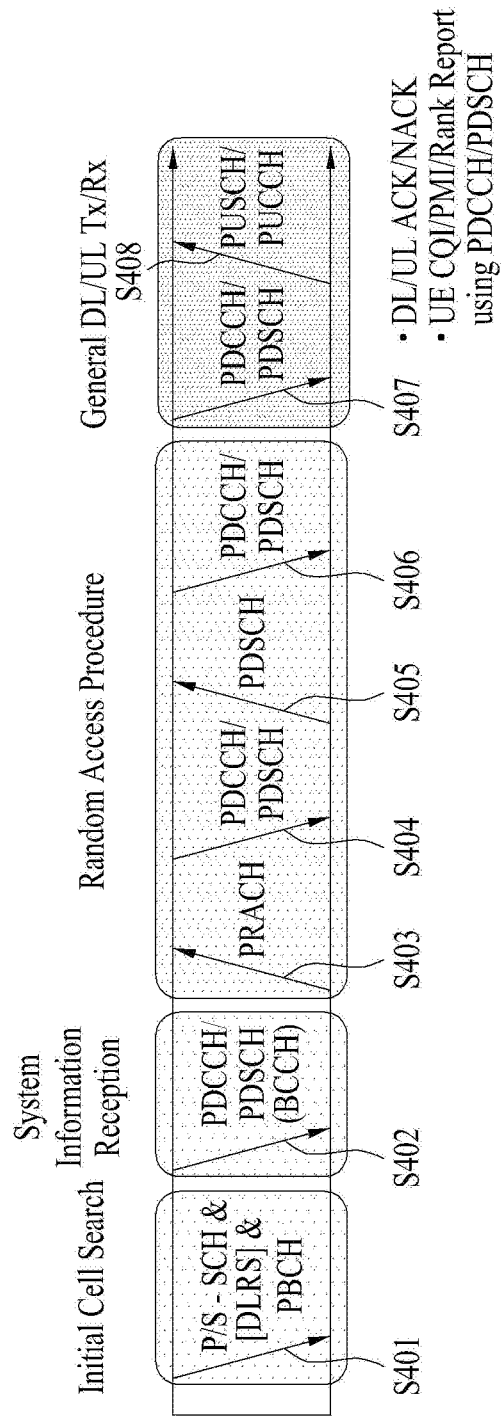
FIG. 4 is a diagram showing physical channels used in a 3GPP system and a general signal transmission method using the same.

FIG. 4 is a diagram showing physical channels used in a 3GPP system and a general signal transmission method using the same.

When a UE is powered on or enters a new cell, the UE performs an initial cell search operation such as synchronization with an eNB (S401). To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S402).

When the UE initially accesses the eNB or has no radio resources for signal transmission, the UE may perform a random access procedure (RACH) with respect to the eNB (steps S403 to S406). To this end, the UE may transmit a specific sequence as a preamble through a physical random access channel (PRACH) (S403) and receive a response message to the preamble through the PDCCH and the PDSCH corresponding thereto (S404). In the case of contention-based RACH, the UE may further perform a contention resolution procedure.

After the above procedure, the UE may receive PDCCH/PDSCH from the eNB (S407) and may transmit a physical uplink shared channel (PUSCH)/physical uplink control channel (PUCCH) to the eNB (S408), which is a general uplink/downlink signal transmission procedure. Particularly, the UE receives downlink control information (DCI) through the PDCCH. Here, the DCI includes control information such as resource allocation information for the UE. Different DCI formats are defined according to different usages of DCI.

Control information transmitted from the UE to the eNB in uplink or transmitted from the eNB to the UE in downlink includes a downlink/uplink acknowledge/negative acknowledge (ACK/NACK) signal, a channel quality indicator (CQI), a precoding matrix index (PMI), a rank indicator (RI), and the like. In the case of the 3GPP LTE system, the UE may transmit the control information such as CQI/PMFRI through the PUSCH and/or the PUCCH.

Figure 5:
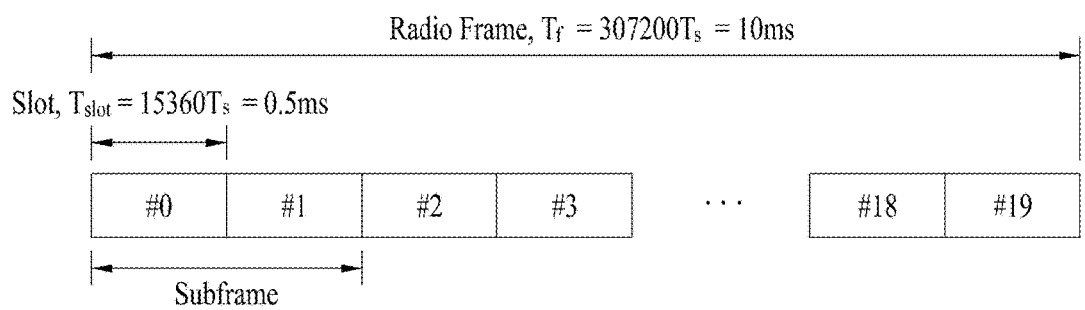
FIG. 5 is a diagram showing the structure of a radio frame used in a Long Term Evolution (LTE) system.

FIG. 5 is a diagram showing the structure of a radio frame used in an LTE system.

Referring to FIG. 5, the radio frame has a length of 10 ms (327200×Ts) and is divided into 10 subframes having the same size. Each of the subframes has a length of 1 ms and includes two slots. Each of the slots has a length of 0.5 ms (15360×Ts). Ts denotes a sampling time, and is represented by Ts=1/(15 kHz×2048)=3.2552×10−8 (about 33 ns). Each of the slots includes a plurality of OFDM symbols in a time domain and a plurality of Resource Blocks (RBs) in a frequency domain. In the LTE system, one RB includes 12 subcarriers×7 (or 6) OFDM symbols. A transmission time interval (TTI) that is a unit time for transmission of data may be determined in units of one or more subframes. The structure of the radio frame is purely exemplary and thus the number of subframes included in the radio frame, the number of slots included in a subframe, or the number of OFDM symbols included in a slot may be changed in various ways.

Hereinafter, an RRC state of a UE and an RRC connection method will be described.

The RRC state indicates whether the RRC layer of the UE is logically connected to the RRC layer of the E-UTRAN. When the RRC connection is established, the UE is in a RRC_CONNECTED state. Otherwise, the UE is in a RRC_IDLE state.

The E-UTRAN can effectively control UEs because it can check the presence of RRC_CONNECTED UEs on a cell basis. On the other hand, the E-UTRAN cannot check the presence of RRC_IDLE UEs on a cell basis and thus a CN manages RRC_IDLE UEs on a TA basis. A TA is an area unit larger than a cell. That is, in order to receive a service such as a voice service or a data service from a cell, the UE needs to transition to the RRC_CONNECTED state.

In particular, when a user initially turns a UE on, the UE first searches for an appropriate cell and camps on the cell in the RRC_IDLE state. The RRC_IDLE UE transitions to the RRC_CONNECTED state by performing an RRC connection establishment procedure only when the RRC_IDLE UE needs to establish an RRC connection. For example, when uplink data transmission is necessary due to call connection attempt of a user or when a response message is transmitted in response to a paging message received from the E-UTRAN, the RRC_IDLE UE needs to be RRC connected to the E-UTRAN.

Figure 6:
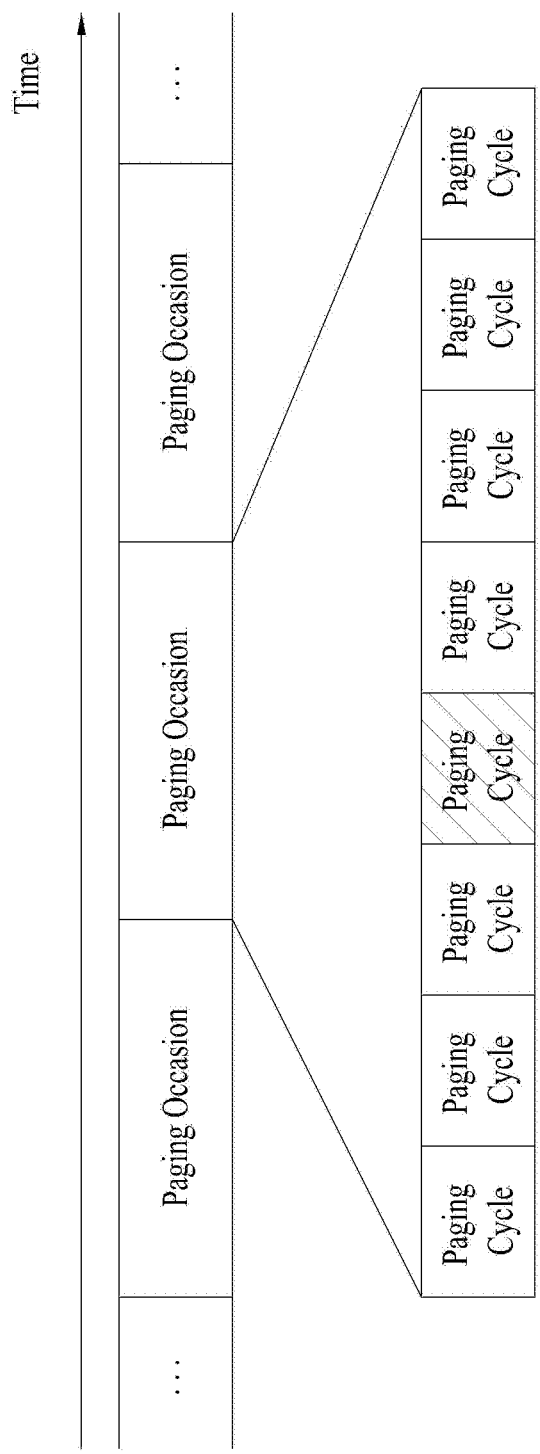
FIG. 6 is a diagram showing a general transmission and reception method using a paging message.

FIG. 6 is a diagram showing a general transmission and reception method using a paging message.

Referring to FIG. 6, the paging message includes a paging record having paging cause and UE identity. Upon receiving the paging message, the UE may perform a discontinuous reception (DRX) operation in order to reduce power consumption.

In detail, a network configures a plurality of paging occasions (POs) in every time cycle called a paging DRC cycle and a specific UE receives only a specific paging occasion and acquires a paging message. The UE does not receive a paging channel in paging occasions other than the specific paging occasion and may be in a sleep state in order to reduce power consumption One PO is a subframe where there may be P-RNTI transmitted on PDCCH addressing the paging message. One Paging Frame (PF) is one Radio Frame, which may contain one or multiple Paging Occasion(s). When DRX is used the UE needs only to monitor one PO per DRX cycle.

The eNB and the UE use a paging indicator (PI) as a specific value indicating transmission of a paging message. The eNB may define a specific identity (e.g., paging-radio network temporary identity (P-RNTI)) as the PI and inform the UE of paging information transmission. For example, the UE wakes up in every DRX cycle and receives a subframe to determine the presence of a paging message directed thereto. In the presence of the P-RNTI on an L1/L2 control channel (a PDCCH) in the received subframe, the UE is aware that a paging message exists on a PDSCH of the subframe. When the paging message includes an ID of the UE (e.g., an international mobile subscriber identity (IMSI)), the UE receives a service by responding to the eNB (e.g., establishing an RRC connection or receiving system information).

More specifically, PF and PO is determined by following formulae using the DRX parameters provided in System Information:

PF is given by following equation:

$$SFN \bmod T = (T \text{ div } N) * (UE\_ID \bmod N)$$

Index i_s pointing to PO from subframe pattern defined in following tables 1 and 2 will be derived from following calculation:

$$i\_s = \text{floor}(UE\_ID/N) \bmod Ns$$

TABLE 1 for FDD

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

TABLE 2 for TDD

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

System Information DRX parameters stored in the UE shall be updated locally in the UE whenever the DRX parameter values are changed in SI. If the UE has no IMSI, for instance when making an emergency call without USIM, the UE shall use as default identity UE_ID=0 in the PF and i_s formulas above.

The following Parameters are used for the calculation of the PF and i_s:
  T: DRX cycle of the UE. T is determined by the shortest of the UE specific DRX value, if allocated by upper layers, and a default DRX value broadcast in system information. If UE specific DRX is not configured by upper layers, the default value is applied.
  nB: 4T, 2T, T, T/2, T/4, T/8, T/16, T/32.
  N: min(T,nB)
  Ns: max(1,nB/T)
  UE_ID: IMSI mod 1024.

IMSI is given as sequence of digits of type Integer (0 . . . 9), IMSI shall in the formulae above be interpreted as a decimal integer number, where the first digit given in the sequence represents the highest order digit.

For example, IMSI=12 (digit1=1, digit2=2)

In the calculations, this shall be interpreted as the decimal integer "12", not "1×16+2=18".

In the following description, system information is explained. First of all, the system information should contain necessary information a user equipment should be aware of to access a base station. Therefore, the user equipment should receive all system information before accessing the base station and should have latest system information all the time. Since all user equipments in a cell should be aware of the system information, the base station periodically transmits the system information.

System information can be divided into MIB (Master Information Block), SB (Scheduling Block) and SIB (System Information Block). The MIB enables a user equipment to recognize such a physical configuration of a corresponding cell as a bandwidth and the like. The SB indicates such transmission information of SIBs as a transmission cycle and the like. In this case, the SIB is an aggregate of system informations related to each other. For instance, a specific SIB contains information of a neighbor cell only and another SIB just contains information of a UL radio channel used by a user equipment.

In the following description, a BCCH (broadcast control channel) Modification Period is explained.

Figure 7:
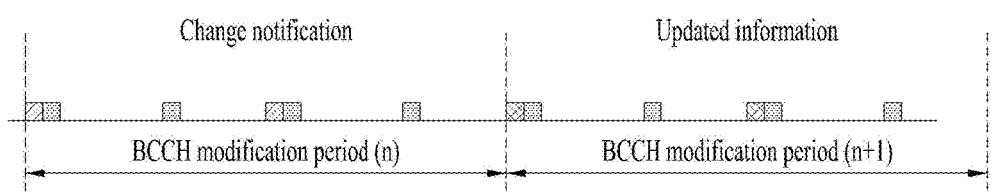
FIG. 7 is a diagram showing general principles related to a change of system information.

FIG. 7 is a diagram showing general principles related to a change of system information.

Change of system information only occurs at specific radio frames, i.e. the concept of a modification period is used. System information may be transmitted a number of times with the same content within a modification period, as defined by its scheduling. The modification period boundaries are defined by SFN values for which SFN mod m=0, where m is the number of radio frames comprising the modification period. The modification period is configured by system information.

When the network changes (some of the) system information, it first notifies the UEs about this change, i.e. this may be done throughout a modification period. In the next modification period, the network transmits the updated system information. These general principles are illustrated in FIG. 7. Upon receiving a change notification, the UE acquires the new system information immediately from the start of the next modification period. The UE applies the previously acquired system information until the UE acquires the new system information.

The Paging message is used to inform UEs in RRC_IDLE and UEs in RRC_CONNECTED about a system information change. If the UE receives a Paging message including the systemInfoModification, the UE knows that the system information will change at the next modification period boundary. Although the UE may be informed about changes in system information, no further details are provided e.g. regarding which system information will change.

More specifically, upon receiving the Paging message, if in RRC_IDLE, for each of the PagingRecord, if any, included in the Paging message and if the ue-Identity included in the PagingRecord matches one of the UE identities allocated by upper layers, the UE shall forward the ue-Identity and the cn-Domain to the upper layers. Further, upon receiving the Paging message, if the systemInfoModification is included, the UE shall re-acquire the required system information using the system information acquisition procedure.

Furthermore, SystemInformationBlockType1 includes a value tag, systemInfoValueTag, that indicates if a change has occurred in the SI messages. UEs may use systemInfoValueTag, e.g., upon return from out of coverage, to verify if the previously stored SI messages are still valid. Additionally, the UE considers stored system information to be invalid after 3 hours from the moment it was successfully confirmed as valid, unless specified otherwise.

E-UTRAN may not update systemInfoValueTag upon change of some system information e.g., ETWS (Earthquake and Tsunami Warning System) information, regularly changing parameters. Similarly, E-UTRAN may not include the systemInfoModification within the Paging message upon change of some system information.

The UE verifies that stored system information remains valid by either checking systemInfoValueTag in SystemInformationBlockType1 after the modification period boundary, or attempting to find the systemInfoModification indication at least modificationPeriodCoeff times during the modification period in case no paging is received, in every modification period. If no paging message is received by the UE during a modification period, the UE may assume that no change of system information will occur at the next modification period boundary. If UE in RRC_CONNECTED, during a modification period, receives one paging message, it may deduce from the presence/absence of systemInfoModification whether a change of system information other than ETWS information will occur in the next modification period or not.

ETWS capable UEs in RRC_CONNECTED shall attempt to read paging at least once every defaultPagingCycle to check whether ETWS notification is present or not.

In the current LTE system, based on System Frame Number (SFN), the Modification period (MP) is decided by the multiplication of paging or DRX cycle. As a result, during the modification period at time (n), an UE hears the paging message and it will update the system information in the next modification periods at time (n+1). However, by increasing the DRX duration longer than the current SFN, 10.24 seconds, the paging cycle is longer than modification period.

Figure 8:
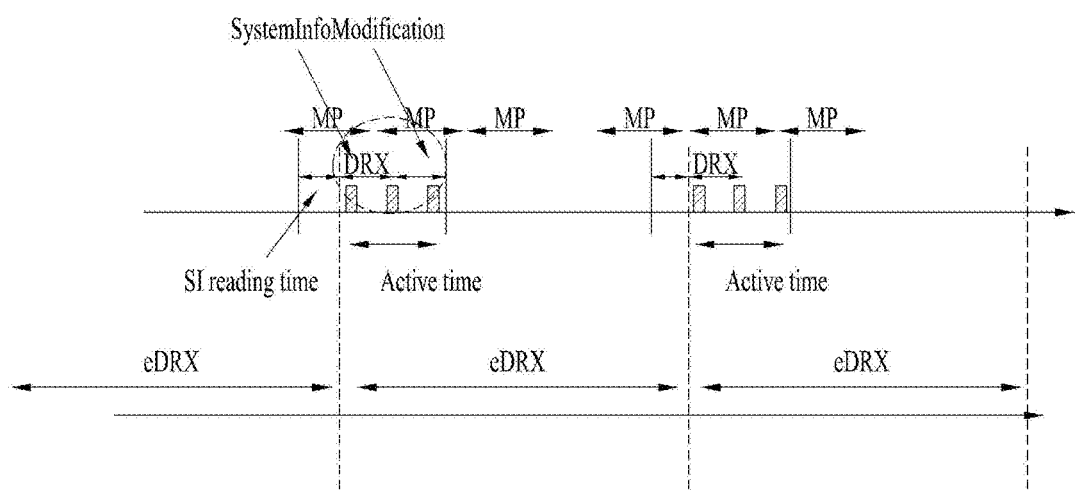
FIG. 8 is a diagram showing general principles related to eDRX.

An UE configured with eDRX (extended DRX) can sleep longer time than the legacy UE. FIG. 8 is a diagram showing general principles related to eDRX.

Referring to FIG. 8, with this long sleep, the way for eDRX UE to read system information (SI) as soon as it wakes up has been considered as one of the possible operations to acquire the SI changes in eDRX. Reading SI after waking up requires because it is possible that SI have been changed within the long sleep. After waking up, the eDRX UE determines the PF/PO based on legacy DRX formula/cycle (i.e. no change on the paging occasion computation). The behavior in eDRX, reading SI after waking up, would give impacts on the UE's operations after receiving the paging message (i.e., updating SI). In this patent, we would like to deal with the possible changes of the eDRX UE's operations after receiving the paging message. Here, the active time can be referred to as a paging transmission window.

In active time, after waking up from the idle mode, if a UE in eDRX receives SystemInfoModification in the boundary of active, the UE should reacquire the SI in the next Modification period, according to the current LTE system. However, this could be unnecessary working because UE will go to sleep by eDRX configuration. In order to solve this unnecessary reading SI and to save battery power, the present invention is suggested.

According to the present invention, when system information will change in the next modification period, if the changed system information in the next BCCH modification period is transmitted before the end of the active time, i.e. before the UE goes to sleep due to the extended DRX cycle, and if the PagingRecord does not include any UE-Identity that matches one of the UE identities allocated by upper layers, the UE shall acquire the changed system information. Otherwise, the UE need not to acquire the changed system information. That is, even if the paging message in the modification period indicates system information modification, the UE does not need to acquire the changed system information in the next modification period while sleeping according to the extended DRX cycle.

Figure 9:
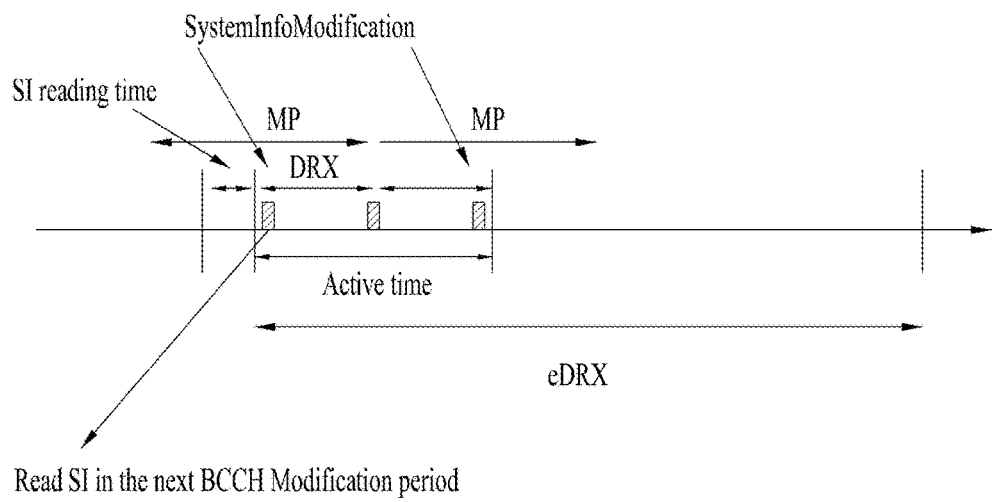
FIG. 9 is a diagram showing a procedure of reacquiring the SI in eDRX in accordance with an embodiment of the present invention.

FIG. 9 is a diagram showing a procedure of reacquiring the SI in the eDRX in accordance with an embodiment of the present invention.

Referring to FIG. 9, it is illustrated that (Active time—consuming time for active time) is greater than (the modification period—consuming time for the modification period), at a first reception point of the SystemInfoModification. In this case, the UE may read the SI in the next BCCH Modification period.

Figure 10:
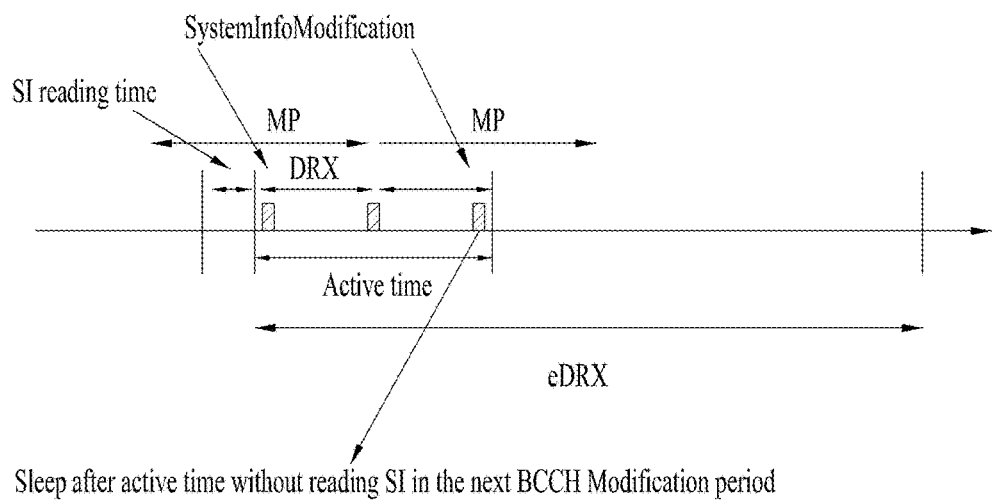
FIG. 10 is a diagram showing a procedure of sleeping in eDRX without reading SI in accordance with an embodiment of the present invention.

FIG. 10 is a diagram showing a procedure of sleeping in the eDRX without reading the SI in accordance with an embodiment of the present invention.

Referring to FIG. 10, it is illustrated that (Active time—consuming time for active time) is less than (the modification period—consuming time for the modification period), at a second reception point of the SystemInfoModification. In this case, the UE may sleep after the active time without reading the SI in the next BCCH Modification period.

In the following description, detail procedures in accordance with the present invention are explained.

Upon receiving the Paging message, if in RRC_IDLE, for each of the PagingRecord, if any, included in the Paging message and if the ue-Identity included in the PagingRecord matches one of the UE identities allocated by upper layers, the UE shall forward the ue-Identity and the cn-Domain to the upper layers.

Further, upon receiving the Paging message including the systemInfoModification, if the PagingRecord does not include any ue-Identity that matches one of the UE identities allocated by upper layers and if transmission of the required system information is in the active time (i.e., if the changed system information in the next BCCH modification period is transmitted before the end of the active time, namely before the UE goes to sleep due to the extended DRX cycle), the UE shall re-acquire the required system information using the system information acquisition procedure. Else (i.e., the PagingRecord includes at least one ue-Identity that matches one of the UE identities or the transmission of the required system information is not in the active time), the UE shall not re-acquire the required system information using the system information acquisition procedure.

Further, if the etws-Indication is included and the UE is ETWS capable, the UE shall re-acquire SystemInformationBlockType1 immediately, i.e., without waiting until the next system information modification period boundary. In this case, if the schedulingInfoList indicates that SystemInformationBlockType10 is present, the UE shall acquire SystemInformationBlockType10. Furthermore, if the schedulingInfoList indicates that SystemInformationBlockType11 is present, the UE shall acquire SystemInformationBlockType11.

Further, if the cmas-Indication is included and the UE is CMAS capable, the UE shall re-acquire SystemInformationBlockType1 immediately, i.e., without waiting until the next system information modification period boundary. In this case, if the schedulingInfoList indicates that SystemInformationBlockType12 is present, the UE shall acquire SystemInformationBlockType12.

Further, if in RRC_IDLE, the eab-ParamModification is included and the UE is EAB (extended access barring) capable. In this case, if the PagingRecord does not include any ue-Identity that matches one of the UE identities allocated by upper layers; and if transmission of the required system information is in the active time (i.e., if the changed system information in the next BCCH modification period is transmitted before the end of the active time, namely before the UE goes to sleep due to the extended DRX cycle), the UE shall consider previously stored SystemInformationBlockType14 as invalid, re-acquire SystemInformationBlockType1 immediately, i.e., without waiting until the next system information modification period boundary, and re-acquire SystemInformationBlockType14 using the system information acquisition procedure.

Figure 11:
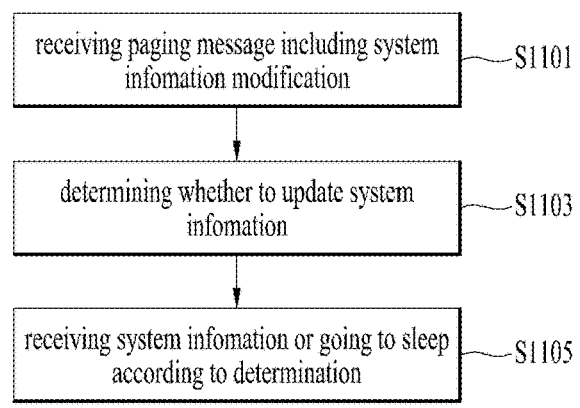
FIG. 11 is a flow chart showing an embodiment of the present invention.

FIG. 11 is a flow chart showing an embodiment of the present invention.

Referring to FIG. 11, in step 1101, the user equipment (UE) configured with an extended discontinuous reception (eDRX) receives a paging message including an indicator indicating system information modification in a modification period within an active time of the eDRX. Of course, according to the eDRX, a number of paging occasions in one active time of the eDRX is two or more.

Next, in step 1103, the UE may determine whether to receive the system information by comparing the active time with the modification period. Specifically, if remaining active time is greater than or equal to remaining modification period, the UE may determine to receive the system information; and if the remaining active time is less than the remaining modification period, the UE may determine not to receive the system information. Preferably, the remaining active time and the remaining modification period is calculated based on a reception time of the paging message.

Finally, in step 1105, the UE may receive the system information in a next modification period or may sleep without receiving the system information upon expiration of the action time, based on the determination.

Figure 12:
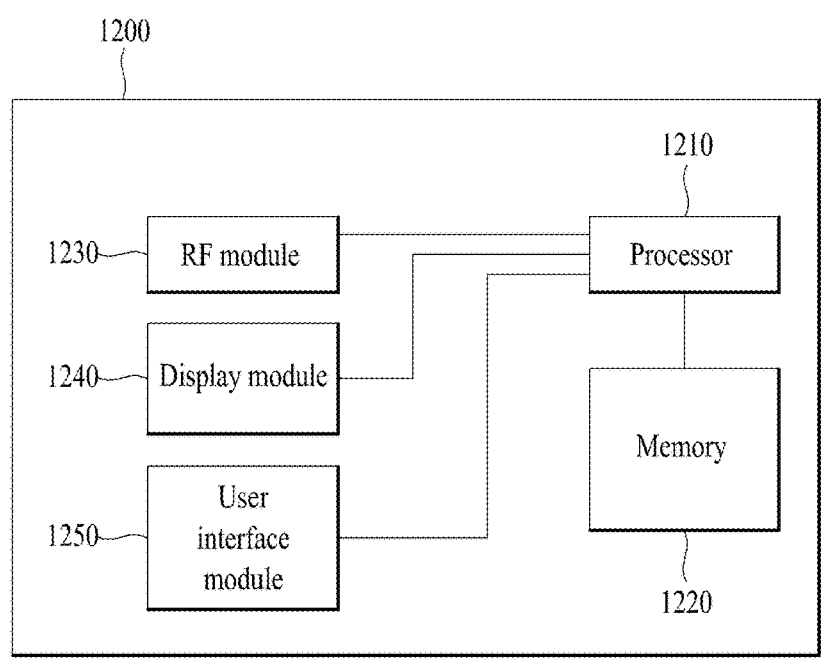
FIG. 12 is a block diagram of a communication apparatus according to an embodiment of the present invention.

FIG. 12 is a block diagram of a communication apparatus according to an embodiment of the present invention.

Referring to FIG. 12, a communication apparatus 1200 includes a processor 1210, a memory 1220, an RF module 1230, a display module 1240, and a User Interface (UI) module 1250.

The communication device 1200 is shown as having the configuration illustrated in FIG. 12, for the convenience of description. Some modules may be added to or omitted from the communication apparatus 1200. In addition, a module of the communication apparatus 1200 may be divided into more modules. The processor 1210 is configured to perform operations according to the embodiments of the present invention described before with reference to the drawings. Specifically, for detailed operations of the processor 1210, the descriptions of FIGS. 1 to 11 may be referred to.

The memory 1220 is connected to the processor 1210 and stores an Operating System (OS), applications, program codes, data, etc. The RF module 1230, which is connected to the processor 1210, upconverts a baseband signal to an RF signal or downconverts an RF signal to a baseband signal. For this purpose, the RF module 1230 performs digital-to-analog conversion, amplification, filtering, and frequency upconversion or performs these processes reversely. The display module 1240 is connected to the processor 1210 and displays various types of information. The display module 1240 may be configured as, not limited to, a known component such as a Liquid Crystal Display (LCD), a Light Emitting Diode (LED) display, and an Organic Light Emitting Diode (OLED) display. The UI module 1250 is connected to the processor 1210 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

According to an embodiment of the present invention, it is possible to efficiently report feedback information for division beamforming in a wireless communication system.

It will be appreciated by persons skilled in the art that that the effects that can be achieved through the present invention are not limited to what has been particularly described hereinabove and other advantages of the present invention will be more clearly understood from the following detailed description.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method of receiving system information by a user equipment (UE) configured with an extended discontinuous reception (eDRX) in a wireless communication system, the method comprising:

receiving, by the UE, a paging message including an indicator indicating system information modification in a modification period within an active time of the eDRX;

determining, by the UE, whether to receive the system information by comparing the active time with the modification period, and receiving, by the UE, the system information in a next modification period when it is determined to receive the system information, wherein a number of paging occasions in one active time of the eDRX is two or more, wherein the step of determining comprises:

if remaining active time is greater than or equal to remaining modification period, determining to receive the system information; and if the remaining active time is less than the remaining modification period, determining not to receive the system information, and wherein the remaining active time and the remaining modification period are calculated based on a reception time of the paging message.

2. The method of claim 1, wherein, if the remaining active time is less than the remaining modification period, the UE sleeps without receiving the system information upon expiration of the active time.

3. A user equipment (UE) configured with an extended discontinuous reception (eDRX) in a wireless communication system, the UE comprising:

a radio frequency (RF) transceiver; and a processor configured to receive, via the RF transceiver, a paging message including an indicator indicating system information modification in a modification period within an active time of the eDRX, determine whether to receive system information by comparing the active time with the modification period, and receive, via the RF transceiver, the system information in a next modification period when it is determined to receive the system information, wherein a number of paging occasions in one active time of the eDRX is two or more, wherein the processor determines:

to receive the system information if remaining active time is greater than or equal to remaining modification period; and not to receive the system information, if the remaining active time is less than the remaining modification period, and wherein the remaining active time and the remaining modification period are calculated based on a reception time of the paging message.

4. The UE of claim 3, wherein, if the remaining active time is less than the remaining modification period, the UE sleeps without receiving the system information upon expiration of the active time.

\* \* \* \* \*